US009652542B2

(12) United States Patent
Kottu et al.

(10) Patent No.: US 9,652,542 B2
(45) Date of Patent: May 16, 2017

(54) SECURELY EXTENDING ANALYTICS WITHIN A DATA WAREHOUSE ENVIRONMENT

(75) Inventors: Rajeswara Rao Kottu, Cary, NC (US); Corey Antwan Parham, Raleigh, NC (US); Sreenath Madasu, Cary, NC (US); Jason Keith Figge, Pittsboro, NC (US)

(73) Assignee: Teradata US, Inc., Dayton, OH (US)

( * ) Notice: Subject to any disclaimer, the term of this patent is extended or adjusted under 35 U.S.C. 154(b) by 779 days.

(21) Appl. No.: 13/081,287

(22) Filed: Apr. 6, 2011

(65) Prior Publication Data

US 2012/0259892 A1 Oct. 11, 2012

(51) Int. Cl.
*G06F 17/30* (2006.01)

(52) U.S. Cl.
CPC .............. *G06F 17/30867* (2013.01)

(58) Field of Classification Search
CPC ............. G06F 21/6218; G06F 21/6227; G06F 2221/2141; G06F 2221/2137; G06F 17/30876; G06F 21/62; G06F 17/30902; G06F 17/30997
USPC ........... 707/600–831, 899, 999.001–999.206
See application file for complete search history.

(56) References Cited

U.S. PATENT DOCUMENTS

| 5,918,232 | A  | * | 6/1999 | Pouschine ......... G06F 17/30592 |
| 6,353,821 | B1 | * | 3/2002 | Gray ............................ 707/715 |
| 7,318,066 | B2 | * | 1/2008 | Kaufman et al. |
| 7,698,348 | B2 |   | 4/2010 | Walker et al. |
| 2006/0107327 | A1 | * | 5/2006 | Sprigg et al. ................... 726/26 |
| 2007/0244650 | A1 |   | 10/2007 | Gauthier |
| 2009/0299955 | A1 |   | 12/2009 | Aski et al. |
| 2011/0231443 | A1 | * | 9/2011 | Hannel ................. H04L 63/105 707/776 |
| 2011/0265188 | A1 | * | 10/2011 | Ramaswamy et al. ......... 726/28 |

OTHER PUBLICATIONS

Nowers (WO 01/52122).*

* cited by examiner

*Primary Examiner* — Angelica Ruiz
(74) *Attorney, Agent, or Firm* — Schwegman, Lundberg & Woessner, P.A.

(57) ABSTRACT

A vendor is authenticated for use of a retailer's data warehouse and limited access rights are assigned to the vendor for access. The vendor accesses a graphical user interface (GUI) to select an available analysis module for execution against the data warehouse. Schemas are presented in the GUI based on the access rights, and specific schema selections are made by the vendor. The analysis module is then configured and executed against the data warehouse and filtered results are presented to the vendor; the results filtered based on the access rights assigned to the vendor.

19 Claims, 3 Drawing Sheets

SECURELY EXTENDING ANALYTICS WITHIN A DATA WAREHOUSE ENVIRONMENT

BACKGROUND

Increasingly enterprises are relying on information collected from customers and suppliers to run their organizations more efficiently. More and more types of information from a variety of sources are being collected and housed in enterprise data warehouses. The information is then mined from a variety of automated and manual sources for purposes of running the organization more efficiently and creating improved relationships with the customers of the enterprise.

Retailers expend a lot of human assets, physical assets, and cash in maintaining and operating their data environments. Access to their data warehouses is closely guarded, since it is viewed as the lifeblood of the organizations. In fact, retailers spend a lot of money in hiring individuals to protect, maintain, and mine their data ware houses, and such individuals are not cheap by any means.

However, by closing out access to the data warehouse many potential ideas and improvements are lost by retailers. That is, many partners of a retailer, such as manufacturers or distributers of goods or services who also have a vested interest in maintaining customer loyalty and increasing the sales of their goods and services, lack access to critical information that may be useful to both the retailers and the vendors. Moreover, vendors would be willing to expend their own resources to utilize the information housed in a retailer's data warehouse, if access to the data warehouse was permitted by that retailer.

Yet, providing access can be problematic for a retailer because it includes vital competitive information of the retailer and could also expose some vendors to a loss of competitive information to another vendor having access to the data warehouse. Moreover, some agreements between a retailer and its vendors may actually prohibit the distribution of competitive information about customers to competitors of the vendors.

So, the answer is not as simple as merely providing vendors access to a retailer's data warehouse and in fact extending access to vendors is a far more complex situation. As a result, vendors generally do not have access to a retailer's data warehouse or to tools of that data warehouse.

SUMMARY

In various embodiments, techniques for extending analytics associated with a data warehouse environment are presented. According to an embodiment, a method for securely extending analytics within a data warehouse environment is provided.

More particularly and in an embodiment, an authenticated user of a data store is associated with a user group for vendors of a retail establishment. Next, an analysis module accessible, via a data store interface, is identified that the user is requesting for processing against the data store. Then, schemas are presented within the data store interface to the user; the schemas comport with access rights of the user to the data store and the access rights based on the user group. Selections are received, via the interface, from the user: for the schemas and for options that are to be assigned to the analysis module. The analysis module is then executed using the schemas against the data store and with the selections to produce results, and the results are provided to the user.

DETAILED DESCRIPTION

Figure 1:
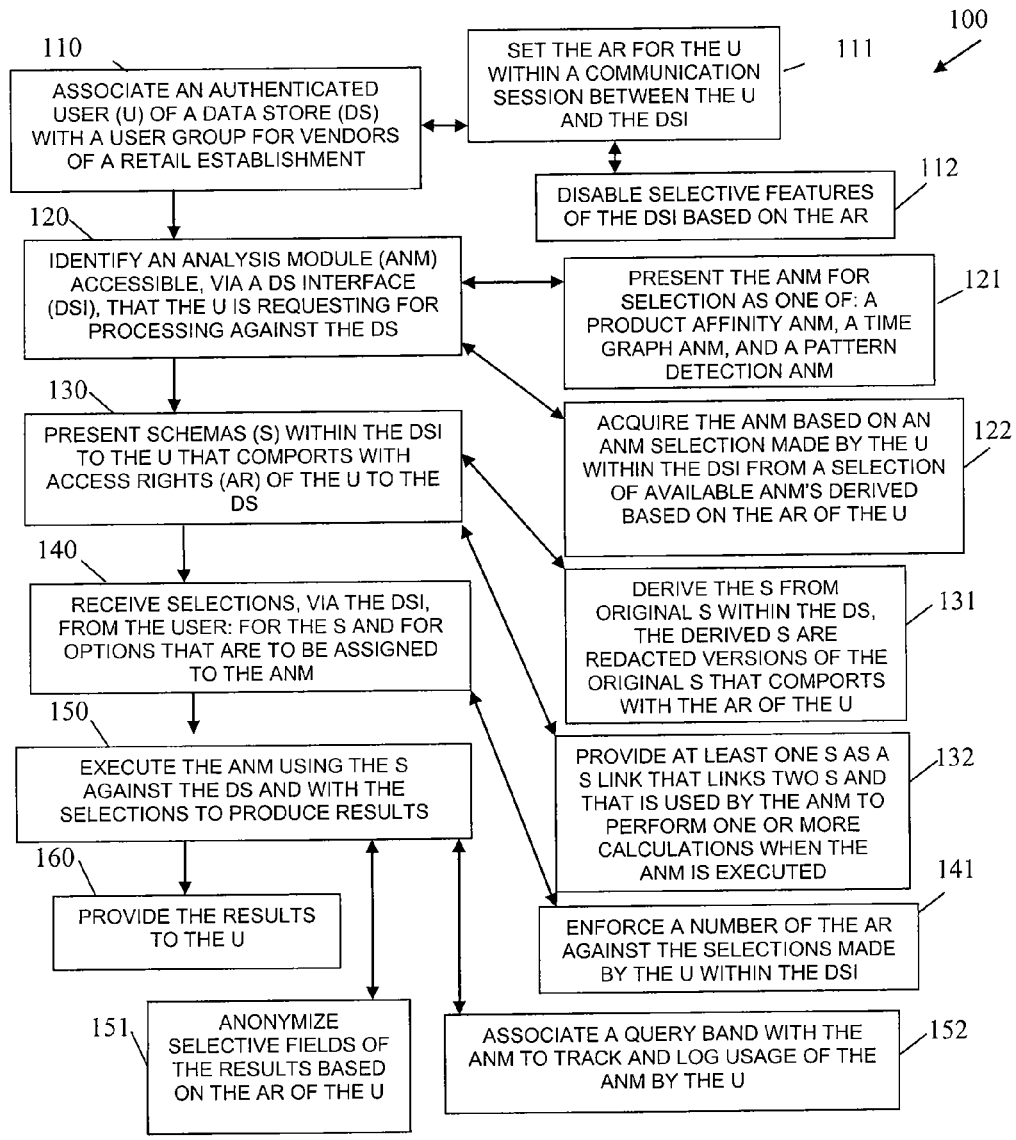
FIG. 1 is a method for securely extending analytics within a data warehouse environment, according to an embodiment.

FIG. 1 is a method 100 for securely extending analytics within a data warehouse environment, according to an embodiment. The method 100 (hereinafter "secure analytic extender tool") is programmed within and resides within a non-transitory computer-readable storage medium as instructions that execute on one or more processors (hardware processors) of a network. Each processor specifically configured with and programmed to execute the secure analytic extender tool. Moreover, the network can be wired, wireless, or a combination of wired and wireless.

At 110, the secure analytic extender tool associates an authenticated user of a data store with a user group for vendors of a retail establishment. The data store can include a directory, a database, a data warehouse (collection of databases), or various combinations of these things.

The user is authenticated via an authentication mechanism that provides initial access to the data store. The user group is a role assigned to the user during authentication that assigns the user to a particular user group based on an identity for the user. In the instant case, the user's identity during authentication assigns the user to the user group that is being used by vendors to access the data store that is owned and controlled by a retail establishment. In other words, with the techniques provided herein a retailer opens up its data warehouse to a vendor for doing limited analysis operations.

As will be demonstrated by the techniques that follow, by opening up a retailer's data warehouse in a limited and secure fashion both the vendor and the retailer benefit. This is so because vendors are motivated to increase profits as well as the retailer; thus, vendors may make better offers to customers to increase the sales of their goods with the retailer by using the techniques presented herein. Moreover, vendors may compete more with one another for offers; thereby creating a better environment for the customers as well. The techniques herein decentralize the marketing and planning for goods and services to the vendors of those goods and services and engage those vendors to increase customer retention and customer satisfaction.

According to an embodiment, at 111, the secure analytic extender tool sets access rights for the user within a communication session between the user and the data store interface. Stated another way, after the user is authenticated for access and is assigned a role (indicating the user belongs to the vendor user group), the user can be assigned access rights while interacting with the data store interface.

Continuing with the embodiment of 111 and at 112, the secure analytic extender tool disables selective features of the data store interface based on the access rights. For example, suppose the data store interface includes a feature to see a list of all users actively accessing the data store along with each user's user identifier. Because, the user interacting with the secure analytic extender tool is a vendor (based on the user's assigned user group role), such a feature can be completely disabled within the data store tool such that the vendor does not see that feature at all. It may also be that the feature is present but grayed out and unavailable to the vendor. So, features can be completely missing from view when disabled or can be viewable but inaccessible when disabled by the secure analytic extender tool At 120, the secure analytic extender tool identifies an analysis module, which is accessible via the data store interface. The analysis module is being requested, via the data store interface, by the user (vendor) for purposes of having that analysis module processed against the data store of the retailer.

Analysis modules use measures to calculate the values for groups of things identified in the data store. Analysis modules use a universe of information that defines the group of things for which an analysis is to be done against. Moreover, analysis modules divide the things being analyzed into smaller sub-groups. Different analysis modules differ from one another in the way they do sub-grouping. Measures are calculated for each sub-group. For example, the measure values can be used: to count the number of people in a sub-group, to count the number of products in a sub-group that are bought, to calculate a total purchase amount of products within a sub-group, to count the number of visits made by customers to stores or a particular store within a sub-group, and the like.

In an embodiment, at 221, the secure analytic extender tool presents the analysis module for selection to the user within the data store interface. The available analysis modules are: a product affinity analysis module, a time graph analysis module, and/or a pattern detection analysis module.

For the product affinity and time graph analysis modules, the schema to analyze and the schema for which the analysis is to occur against can be controlled based on the user's association with the user group (vendor group). Moreover, each schema includes its own set of schema elements that are selectable by the use and these two can be controlled based on the user's role assignment to the vendor user group.

Usage of the pattern detection analysis module is discussed by way of example below with respect to the processing at 132.

In another scenario, at 122, the secure analytic extender tool acquires the analysis module based on a selection made by the user within the data store interface from a selection of available analysis modules, which are derived based on the access rights assigned to the user for use within the data store interface. Again, the access rights can be assigned based on the user's assigned role to the vendor user group.

At 130, the secure analytic extender tool presents schemas within the data store interface to the user. Each presented schema comports to or with the assigned access rights of the user.

According to an embodiment, at 131, the secure analytic extender tool derives the schemas from original schemas within the data store. So, if an original schema includes phone numbers of customers, such information can be redacted out of a derived schema that is presented for selection to the user (vendor). Policy can dictated what is redacted out and what is not in the presented schema based on the access rights and elements in the original schema.

In an embodiment, at 132, the secure analytic extender tool provides at least one schema as a schema link that links two schemas, which are used by the analysis module to perform one or more calculations (measures) when the analysis module is subsequently executed.

For example, with a pattern detection analysis module, the cross schema link is used to define the two schemas and two schema elements. The cross schema link has two schemas and the data store table from which data can be retrieved and analyzed. The assignment of the user to the vendor user group is used to control the cross schema links that are displayed with the pattern detection analysis module. The cross schema link defines a relationship such that when it is selected a particular schema for an item (such as a product) is presented and selected by the user. This in turn drives the schema elements that the user can select, such as a particular category of products.

At 140, the secure analytic extender tool receives selections, via the data store interface, for the schema and for options that are to be assigned to the analysis module. In other words, the user, via the data store interface, selects a particular analysis module, particular schemas, and perhaps other setting values for each and this information is used by the secure analytic extender tool to configure the selected analysis module for processing against the data store using the selected schema and settings.

In an embodiment, at 141, the secure analytic extender tool enforces a number of the access rights against the selections made by the user within the data store interface. So, another check can be made to ensure the proper security is being enforced against the vendor (user).

At 150, the secure analytic extender tool executes the analysis module using the schemas against the data store and with the selections made at 140 for purposes of producing results.

According to an embodiment, at 151, the secure analytic extender tool anonymizes selective fields of the results based on the assigned access rights of the user. In other words, information can be blacked out, changed, or missing from certain fields of the results when those fields are not permitted by the access rights assigned to the vendor (user).

In another circumstance, at 152, the secure analytic extender tool associates a query band with the analysis module for purposes of tracking and logging usage of the analysis module by the user. Query band functionality is provided by Teradata, Inc. of Miamisburg, Ohio.

Finally, at 160, the secure analytic extender tool provides the results to the user. Results can be provided via the data store interface, via a separate interface, or even via a file or another data store table. Moreover, in some cases, an Application Programming Interface (API) can be used to create automated scripts that pass the results to other modules that analyze the results for the vendor. So manual and automated analysis can be achieved on the results.

Figure 2:
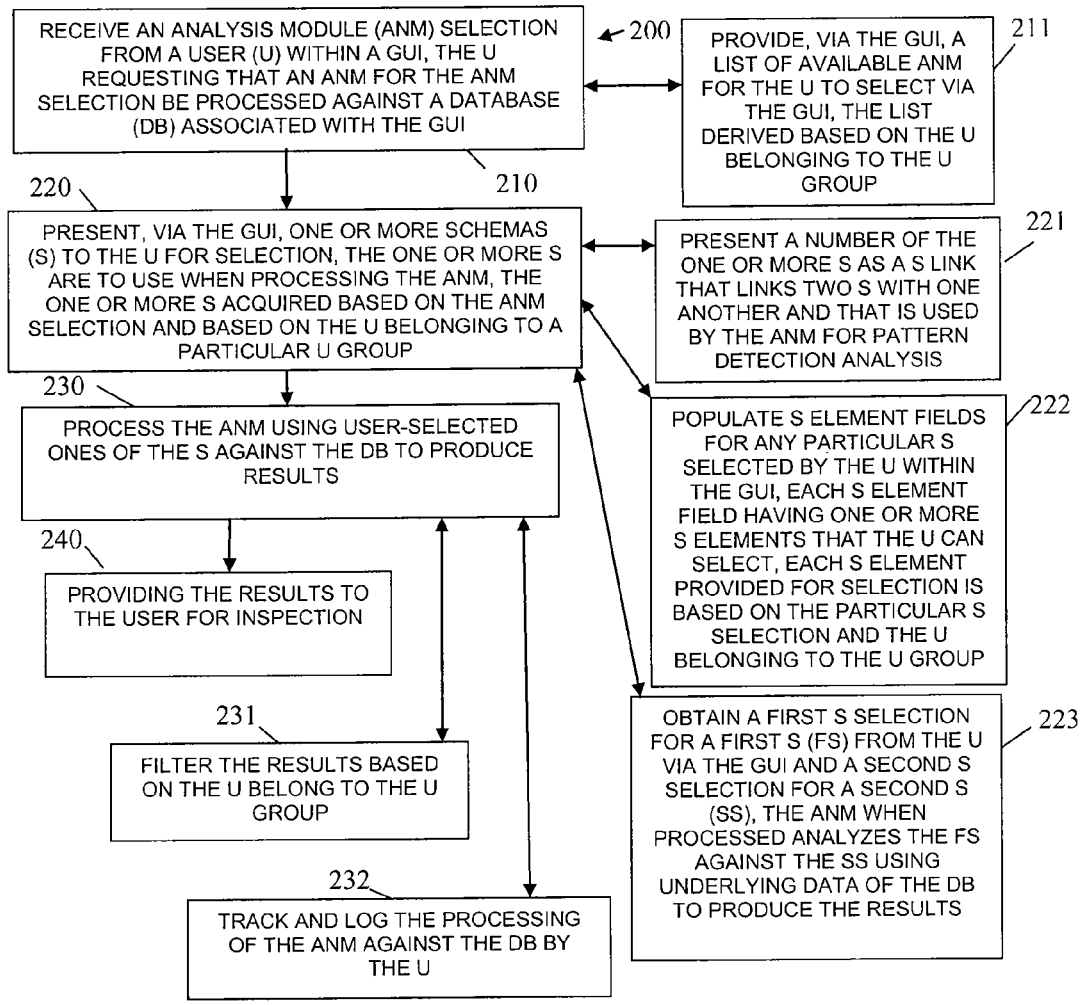
FIG. 2 is a diagram of another method for securely extending analytics within a data warehouse environment, according to an embodiment.

FIG. 2 is a diagram of another method 200 for securely extending analytics within a data warehouse environment, according to an embodiment. The method 200 (hereinafter "analytic manager") is programmed within and resides within a non-transitory computer-readable storage medium as instructions that execute on one or more processors (hardware processors) of a network. Each processor specifically configured with and programmed to execute the analytic manager. Moreover, the network can be wired, wireless, or a combination of wired and wireless.

The analytic manager presents another and in some cases enhanced perspective of the secure analytic extender tool presented above with respect to the discussion of the FIG. 1.

At 210, the analytic manager receives an analysis module selection from a user within a Graphical User Interface (GUI). The user is requesting that an analysis module for the analysis module selection be processed against a database (the database associated with the GUI).

According to an embodiment, at 211, provides, via the GUI, a list of available analysis modules for the user to select. The list is derived based on the user belong to the user group. So, when the user is authenticated a role assigned to the user identifies that the user is associated with the user group, and then based on this role assignment the list of available analysis modules that are available for this particular user group is presented to the user for selection via the GUI.

At 220, the analytic manager presents, via the GUI, one or more schemas to the user for selection. The one or more schemas are to use when processing the analysis module and the one or more schemas are acquired based on the selection of the analysis module (at 210) and also based on the user's association or assignment to a particular user group.

In an embodiment, at 221, the analytic manager presents a number of the one or more schemas as a schema link that links two schemas with one another and that is used by the analysis module for pattern detection analysis. This scenario was discussed above with reference to the processing of 131 of the FIG. 1.

In another case, at 222, the analytic manager populates schema element fields for any particular schema selected by the user. Each schema element field has one or more schema elements that the user can select. Moreover, each schema element that is provided for selection is based on the particular schema selection and the user belonging to the user group.

In still another situation, at 223, the analytic manager obtains a first schema selection for a first schema from the user via the GUI and a second schema selection for a second schema. The analysis module, when processed, analyzes the first schema against the second schema using underlying data of the database to produce results.

At 230, the analytic manager processes the analysis module using user-selected ones of the schema against the database to produce the results.

In an embodiment, at 231, the analytic manager filters the results based on the user belonging to the user group.

In another scenario, at 232, the analytic manager tracks and logs the processing of the analysis module against the database by the user.

Finally, at 240, the analytic manager provides the results to the user for inspection. Again, this can be done via the GUI for immediate manual inspection of can be achieved via a file or database table. Moreover, the results themselves can be fed via an API to another automated service for analysis.

Figure 3:
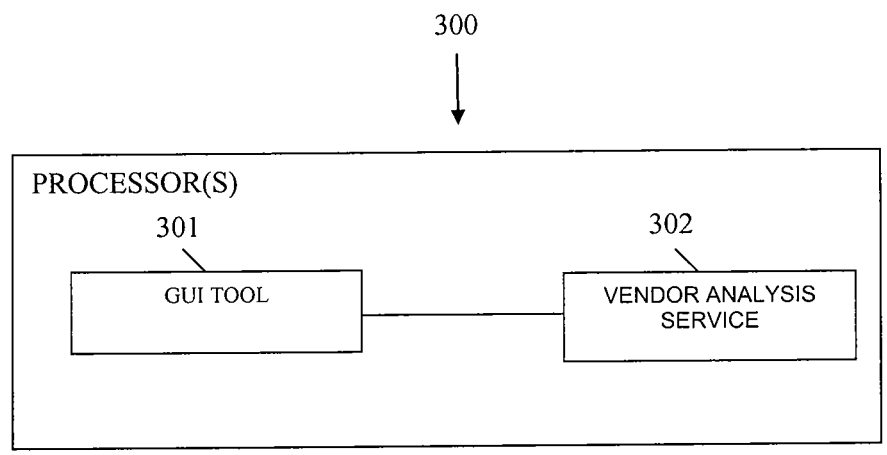
FIG. 3 is a diagram of an extended analytic data warehouse system, according to an embodiment.

FIG. 3 is a diagram of an extended analytic data warehouse system 300, according to an embodiment. The extended analytic data warehouse system 300 includes one or more processors that are configured to process a variety of components (discussed below). Each component is programmed within and resides within a non-transitory computer-readable medium as instructions that execute on the one or more processors over a network. The network is wired, wireless, or a combination of wired and wireless.

In an embodiment, the extended analytic data warehouse system 300 implements, inter alia, the processing discussed above with respect to the methods 100 and 200 of the FIGS. 1 and 2, respectively.

The extended analytic data warehouse system 300 includes a GUI tool 301 and a vendor analysis service 302. Each of these components and their interactions with one another will now be discussed in turn.

A processor is configured with the GUI tool 301. The GUI tool 301 is programmed, implemented, and resides in a non-transitory computer-readable storage medium and is for execution on the processor or multiple processors of a multi-processor system. Example aspects of the GUI tool 301 were presented above with reference to the FIGS. 1 and 2, respectively.

The GUI tool 301 is configured to interact with a vendor to provide analysis modules that the vendor can execute against a data store of a retailer.

According to an embodiment, the GUI tool 301 is a vendor analytic tool provided to the vendor from the retailer as a frontend to the data store.

The processor is also configured with the vendor analysis service 302, which is programmed, implemented, and resides within a non-transitory computer-readable storage medium for executing on the processor or other processors of the network in a multiprocessor system. Example processing associated with the vendor analysis service 302 was presented above with reference to the FIGS. 1 and 2, respectively.

The vendor analysis service 302 is configured: to drive options presented within the GUI tool 301 to the vendor based on access rights assigned to the vendor; to receive selections from the vendor, via the GUI tool 301, for configuring a selected analysis module; and to execute and provide results from the execution of the selected analysis module to the vendor.

According to an embodiment, the vendor analysis service 302 is further configured to filter the results before providing the results to the vendor based on the access rights assigned to the vendor.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

The invention claimed is:

1. A method, comprising:

associating, by a processor, an authenticated user of a data store with a user group and disabling from a view of the user some features of the data store based on access rights assigned to the user;

identifying, by the processor, an analysis module accessible, via a data store interface, that the user is requesting for processing against the data store, the analysis module calculates groups of information identified in the data store;

presenting, by the processor, schemas within the data store interface to the user that comports with the access rights of the user to the data store, the access rights based on the user group, and the access rights assigned in the schema to the schema elements and presenting the schemas based on the access rights assigned to the user by evaluating policy during the presenting, wherein at least a portion of at least one schema is redacted out based on the evaluation of the policy;

receiving, by the processor, selections, via the data store interface, from the user: for the schemas and for options that are to be assigned to the analysis module and the selections including schema elements for each schema selected by the user, the each schema element controlled based on the user's access rights;

executing, by the processor, the analysis module for information in the data store defined by the selections to produce results; and providing, by the processor, the results to the user.

2. The method of claim 1, wherein associating further includes setting the access rights for the user within a communication session between the user and the data store interface.

3. The method of claim 2, wherein setting further includes disabling selective features of the data store interface based on the access rights.

4. The method of claim 1, wherein identifying further includes presenting the access module for selection as one of: a product affinity analysis module, a time graph analysis module, and a pattern detection analysis module.

5. The method of claim 1, wherein identifying further includes acquiring the analysis module based on an analysis module selection made by the user within the data store interface from a selection of available analysis modules derived based on the access rights of the user.

6. The method of claim 1, wherein presenting further includes deriving the schemas from original schemas within the data store, the derived schemas are redacted versions of the original schemas that comports with the access rights of the user.

7. The method of claim 1, wherein presenting further includes providing at least one schema as a schema link that links two different schemas and that is used by the analysis module to perform one or more calculations when the analysis module is executed.

8. The method of claim 1, wherein receiving further includes enforcing a number of the access rights against the selections made by the user within the data store interface.

9. The method of claim 1, wherein executing further includes anonymizing selective fields of the results based on the access rights of the user.

10. The method of claim 1, wherein executing further includes associating a query band with the analysis module to track and log usage of the analysis module by the user.

11. A method comprising:
receiving, by a processor, an analysis module selection from a user within a Graphical User Interface (GUI), the user requesting that the analysis module be processed against a database associated with the GUI;
presenting, by the processor and via the GUI, schemas to the user for selection along with schema elements for each schema, the schemas are evaluated when processing the analysis module, the schemas and the schema elements for each schema acquired and presented based on the user selection of the analysis module and based on the user belonging to a particular user group and having access rights and disabling some features of the database preventing the user from viewing those features based on the access rights, the access rights assigned in the schema to the schema elements and presenting the schemas based on evaluating policy during the presenting, wherein at least a portion of at least one schema is redacted out based on the evaluation of the policy;
processing, by the processor, the analysis module by evaluating user-selected ones of the schemas and the schema elements against the database to produce results, the analysis module calculating values for groups of information defined in the database defined by the selected schemas; and
providing, by the processor, the results to the user for inspection.

12. The method of claim 11, wherein receiving further includes providing, via the GUI, a list of available analysis modules for the user to select via the GUI, the list derived based on the user belonging to the user group.

13. The method of claim 11, wherein presenting further includes presenting a number of the schemas as a schema link that links two schemas with one another and that is used by the analysis module for pattern detection analysis.

14. The method of claim 11, wherein presenting further includes obtaining a first schema selection for a first schema from the user via the GUI and a second schema selection for a second schema, the analysis module when processed analyzes the first schema against the second schema using underlying data of the database to produce the results.

15. The method of claim 11, wherein processing further includes filtering the results based on the user belong to the user group.

16. The method of claim 11, wherein processing further includes tracking and logging the processing of the analysis module against the database by the user.

17. A processor-implemented system, comprising:
a processor configured with a graphical user interface (GUI) tool that is programmed within a non-transitory computer-readable medium and executes on the processor; and
the processor configured with a vendor analysis service that is programmed within a non-transitory computer-readable medium and executes on the processor;
the GUI tool configured to interact with a vendor to provide analysis modules that the vendor can execute against a data store, the vendor analysis service adapted to: (i) drive options presented within the GUI tool to the vendor based on access rights assigned to the vendor and to hide some other options from a view of the vendor based on the access rights during authentication of the vendor, (ii) receive selections from the vendor via the GUI tool for configuring a selected analysis module, (iii) present schemas and schema elements for each schema for the data store to the vendor for schema selections and schema element selections based on the selected analysis module and the access rights and the access rights assigned to the schema elements in the schemas based on the vendor and evaluation of policy during presentation of the schemas and schema elements, wherein at least a portion of at least one schema is redacted out based on the evaluation of the policy, and (iv) execute and provide results from the execution of the selected analysis module to the vendor, wherein the selected analysis module calculates values for groups of information defined in the data store defined by the schema selections and the schema element selections.

18. The system of claim 17, wherein the vendor analysis service is further configured to filter the results before providing to the vendor based on the access rights assigned to the vendor.

19. The system of claim 17, wherein the GUI tool is a vendor analytic tool provided to the vendor from the retailer as a frontend to the data store.

* * * * *